US012591714B2

(12) United States Patent
Pedersen

(10) Patent No.: US 12,591,714 B2
(45) Date of Patent: Mar. 31, 2026

(54) MITIGATING SIDE CHANNEL ATTACKS

(71) Applicant: Nordic Semiconductor ASA, Trondheim (NO)

(72) Inventor: Frode Pedersen, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 179 days.

(21) Appl. No.: 18/388,741

(22) Filed: Nov. 10, 2023

(65) Prior Publication Data

US 2024/0160793 A1    May 16, 2024

(30) Foreign Application Priority Data

Nov. 11, 2022    (GB) ...................................... 2216890

(51) Int. Cl.
| | |
|---|---|
| *G06F 21/75* | (2013.01) |
| *G06F 1/08* | (2006.01) |
| *G06F 21/72* | (2013.01) |
| *H03L 7/099* | (2006.01) |

(52) U.S. Cl.
CPC ................ *G06F 21/75* (2013.01); *G06F 1/08* (2013.01); *G06F 21/72* (2013.01); *H03L 7/099* (2013.01)

(58) Field of Classification Search
CPC . G06F 21/75; G06F 1/08; G06F 21/72; H03L 7/099
USPC .......................................................... 726/23
See application file for complete search history.

(56) References Cited

U.S. PATENT DOCUMENTS

| | | | | | |
|---|---|---|---|---|---|
| 4,550,292 | A | * | 10/1985 | Smith | .................... H03L 7/1806 331/2 |
| 5,268,654 | A | * | 12/1993 | Furutani | ................. H03L 7/183 331/25 |
| 5,359,156 | A | * | 10/1994 | Chan | ..................... G06F 3/0442 345/173 |

(Continued)

FOREIGN PATENT DOCUMENTS

WO    WO-2021122816 A1 *  6/2021   ............... H03K 5/26

OTHER PUBLICATIONS

Damphousse, S., Ouici, K., Rizki, A., & Mallinson, M. (2006). All digital spread spectrum clock generator for EMI reduction. IEEE Journal of Solid-State Circuits, 42(1), 145-150. (Year: 2006).*

(Continued)

*Primary Examiner* — Philip J Chea
*Assistant Examiner* — Dorianne Alvarado David
(74) *Attorney, Agent, or Firm* — Klarquist Sparkman, LLP

(57) ABSTRACT

An integrated circuit includes a closed loop oscillator circuit portion. The closed loop oscillator circuit portion has an input for a reference clock signal and an output providing an output clock signal to one or more further components of the integrated circuit. The output clock signal has an average output frequency derived from the reference clock signal. The closed loop oscillator circuit portion is operable in a spread spectrum mode in which the closed loop oscillator circuit portion varies a frequency of said output clock signal, by temporarily increasing the frequency by a predetermined amount and temporarily decreasing the frequency by said predetermined amount, at different times, within a predetermined multiple of a clock cycle of the reference clock signal.

14 Claims, 4 Drawing Sheets

(56) References Cited

U.S. PATENT DOCUMENTS

Figure 1:
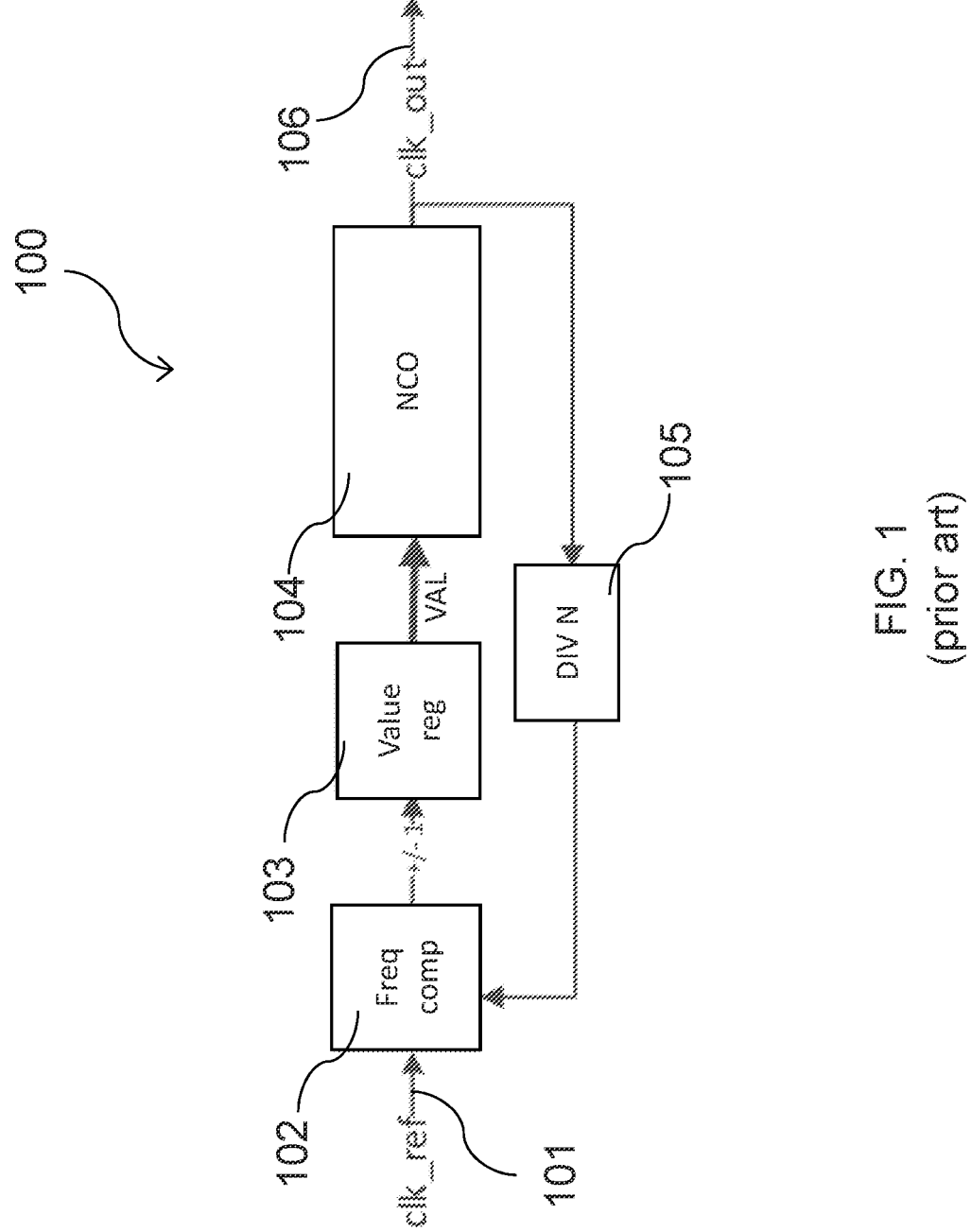

| | | | | |
|---|---|---|---|---|
| 7,453,921 | B1 * | 11/2008 | Gossett | H04B 1/7101 375/147 |
| 7,477,676 | B2 * | 1/2009 | Kokubo | G06F 1/04 375/376 |
| 8,433,024 | B2 * | 4/2013 | Chiang | H04B 1/69 375/376 |
| 8,831,064 | B1 * | 9/2014 | Kaviani | H04B 15/04 375/132 |
| 10,200,036 | B1 * | 2/2019 | Ward | H03L 5/00 |
| 10,826,502 | B1 * | 11/2020 | Badizadegan | H03L 7/0812 |
| 10,908,635 | B1 * | 2/2021 | Ranganathan | H03L 7/22 |
| 11,431,328 | B1 * | 8/2022 | Wong | H03K 5/00006 |
| 11,493,950 | B2 * | 11/2022 | Fredenburg | H03L 7/093 |
| 12,015,450 | B2 * | 6/2024 | Patole | H02J 50/10 |
| 2005/0008113 | A1 * | 1/2005 | Kokubo | H04B 15/04 375/376 |
| 2007/0192658 | A1 * | 8/2007 | Pedersen | G01R 31/31725 714/724 |
| 2009/0309666 | A1 * | 12/2009 | Sun | H03L 7/099 331/44 |
| 2011/0169582 | A1 | 7/2011 | Kim et al. | |
| 2011/0260749 | A1 * | 10/2011 | Deas | H04L 9/003 326/8 |
| 2011/0285421 | A1 * | 11/2011 | Deas | G06F 21/755 326/8 |
| 2012/0068775 | A1 * | 3/2012 | Leistad | H03L 7/183 331/57 |
| 2014/0156872 | A1 * | 6/2014 | Buer | G06F 21/53 710/8 |
| 2014/0177681 | A1 * | 6/2014 | Chung | H04B 1/7097 375/146 |
| 2014/0233732 | A1 * | 8/2014 | Buer | H04N 21/2543 380/200 |
| 2014/0361812 | A1 * | 12/2014 | Yamashina | H03B 28/00 327/107 |
| 2016/0026208 | A1 * | 1/2016 | Koh | G06F 1/08 327/114 |
| 2016/0099719 | A1 | 4/2016 | Iwasaki | |
| 2016/0105187 | A1 * | 4/2016 | J. | H03K 3/0315 331/36 C |
| 2016/0285467 | A1 * | 9/2016 | Reddy | H03L 7/0991 |
| 2017/0244546 | A1 * | 8/2017 | Stark | G06F 7/582 |
| 2018/0062661 | A1 * | 3/2018 | Kumar | H03L 7/099 |
| 2018/0309566 | A1 * | 10/2018 | Buch | G06F 12/0246 |
| 2018/0351558 | A1 * | 12/2018 | Kuo | G04F 10/005 |
| 2019/0173454 | A1 * | 6/2019 | Jun | H03L 7/0802 |
| 2019/0332135 | A1 * | 10/2019 | Tamura | G06F 1/06 |
| 2021/0111751 | A1 * | 4/2021 | Wei | H03K 3/84 |
| 2021/0191451 | A1 * | 6/2021 | Gajda | H03L 1/026 |
| 2021/0336626 | A1 * | 10/2021 | Matei | H02M 1/15 |
| 2022/0294459 | A1 * | 9/2022 | Chen | H03L 7/085 |
| 2022/0302911 | A1 * | 9/2022 | Wei | G06F 1/04 |
| 2024/0146310 | A1 * | 5/2024 | He | H03K 5/26 |
| 2024/0403257 | A1 * | 12/2024 | Zhang | G06F 13/4022 |
| 2025/0199566 | A1 * | 6/2025 | Liao | G06F 1/12 |

OTHER PUBLICATIONS

Heredia, N. J. (Feb. 2002). Spread spectrum clock-an EMC solution for new generation portable computers. In Proceedings of the International Conference on Electromagnetic Interference and Compatibility (IEEE Cat. No. 02TH8620) (pp. 146-151). IEEE. (Year: 2002).*

Lee, I. T., Ku, S. H., & Liu, S. I. (2013). An all-digital spread-spectrum clock generator with self-calibrated bandwidth. IEEE Transactions on Circuits and Systems I: Regular Papers, 60(11), 2813-2822. (Year: 2013).*

Lombardi, M.A. (2003). Time and Frequency. In R. A. Meyers (Ed.), Encyclopedia of Physical Science and Technology (Third Edition), Academic Press, pp. 783-801. https://doi.org/10.1016/B0-12-227410-5/00780-8. (Year: 2003).*

Sheng, D., Chung, C. C., & Lee, C. Y. (Nov. 2008). An all digital spread spectrum clock generator with programmable spread ratio for SoC applications. In APCCAS 2008-2008 IEEE Asia Pacific Conference on Circuits and Systems (pp. 850-853). IEEE. (Year: 2008).*

Vidya, P. M., & Sudha, S. (Jul. 2016). Reduction of radiated emission in sequential circuits. In 2016 IEEE Technological Innovations in ICT for Agriculture and Rural Development (TIAR) (pp. 213-217). IEEE. (Year: 2016).*

Wang, H., et al. (Dec. 2013). A programmable DCO-based digital clock multiplier and divider. In 2013 2nd International Symposium on Instrumentation and Measurement, Sensor Network and Automation (IMSNA) (pp. 498-502). IEEE. (Year: 2013).*

Vijayalakshmi, Ch., Lavanya, B. (Jul. 2013). All Digital Spread Spectrum Clock Generator. In International Journal of Research in Computer and Communication Technology, 2(7), 482-488. (Year: 2013).*

Arcus, C. (Jan. 17, 2000). Spread spectrum reduces EMI problem. EE Times. https://www.eetimes.com/spread-spectrum-reduces-emi-problem/ (Year: 2000).*

Curtis, P. and Lee, E. (Jun. 2020). EMI Reduction Technique, Dual Random Spread Spectrum. Application Note, Texas Instruments. Inc. (Year: 2020).*

Leonard, J. (Nov 1, 2004). Dual Switcher with Spread Spectrum Reduces EMI. Linear Technol. Mag, pp. 9-11. (Year: 2004).*

Maas, K. (Apr. 28, 2008). Suppressing and containing? Try spread spectrum clocking to reduce EMI. EE Times. https://www.eetimes.com/suppressing-and-containing-try-spread-spectrum-clocking-to-reduce-emi/ (Year: 2008).*

Maxim Integrated. (May 29, 2003). Using Spread Spectrum Oscillators to Reduce Radiated Emissions in Consumer Products. Application Note 1995. https://www.analog.com/en/resources/technical-articles/using-spread-spectrum-oscillators-to-reduce-radiated-emissions-in-consumer-products.html (Year: 2003).*

Mediano, A. (Apr. 1, 2016). Using Spread Spectrum Techniques to Reduce EMI. InCompliance. https://incompliancemag.com/using-spread-spectrum-techniques-to-reduce-emi/ (Year: 2016).*

Regan, T., & La Porte, D. (2004). Easy-to-use spread spectrum clock generator reduces EMI and more. Linear Technol. Mag, 16, pp. 6-12. https://www.analog.com/media/en/technical-documentation/tech-articles/lt-journal-article/LT6902_0204_Mag.pdf (Year: 2004).*

Zimmer, G. and Scott, K. (Nov. 4, 2015). Spread Spectrum Frequency Modulation Reduces EMI. Analog Devices, Inc. Technical Articles. https://www.analog.com/en/resources/technical-articles/spread-spectrum-frequency-modulation-reduces-emi.html (Year: 2015).*

IPO Combined Search and Examination Report for GB2216890.0, dated May 9, 2023, 6 pages.

* cited by examiner

MITIGATING SIDE CHANNEL ATTACKS

CROSS-REFERENCE TO RELATED APPLICATION

This application claims priority from Great Britain Application No. 2216890.0, filed on Nov. 11, 2022, which application is incorporated herein by reference in its entirety.

TECHNICAL BACKGROUND

Integrated circuits in operation typically emit 'side channel information' in the form of electromagnetic emissions, also known as electromagnetic interference (EMI), which can reveal information about operations being carried out which can sometimes be used to guess secret cryptographic keys. Side channel attacks exploit statistical analysis of this side channel information, which typically involves aligning a number of traces, typically in the thousands, to understand how they correlate with possible key values to gain access to the secret keys and therefore gain access to the protected information in the integrated circuit.

It has been proposed to try to thwart such attacks by clocking components on the integrated circuit using spread spectrum oscillators which exhibit variations in their frequency through a low inherent accuracy and thus render unreliable the side channel information that is emitted. The Applicant has recognised however that this introduces a further problem since such oscillators have an unpredictable average frequency which reduces the efficiency of the components which are clocked by them.

The present invention aims to at least partly to address this problem.

SUMMARY

From a first aspect, the invention provides an integrated circuit comprising:

a closed loop oscillator circuit portion comprising:

an input for a reference clock signal;

an output providing an output clock signal to one or more further components of the integrated circuit, the output clock signal having an average output frequency derived from the reference clock signal;

wherein the closed loop oscillator circuit portion is arranged to be operable in a spread spectrum mode in which the closed loop oscillator circuit portion varies a frequency of said output clock signal, by temporarily increasing the frequency by a predetermined amount and temporarily decreasing the frequency by said predetermined amount, at different times, within a predetermined multiple of a clock cycle of the reference clock signal.

From a second aspect, the invention provides a method of operating an integrated circuit, the integrated circuit comprising a closed loop oscillator circuit portion, comprising the oscillator circuit portion:

receiving a reference clock signal;

generating an output clock signal having an average output frequency derived from the reference clock signal, providing said output clock signal to one or more further components of the integrated circuit;

and the method comprising, in a spread spectrum mode:

the oscillator circuit portion varying a frequency of said output clock signal, by:

temporarily increasing the frequency; and temporarily decreasing the frequency by said predetermined amount, at different times, within a predetermined multiple of a clock cycle of the reference clock signal.

Thus, it will be appreciated by those skilled in the art that in accordance with the present invention, the oscillator circuit portion may operate in a spread spectrum mode in which the instantaneous frequency of the output clock signal is varied whilst the average frequency of the output clock may remain frequency locked to a reference clock to improve accuracy. This new operating mode thus adds spread spectrum functionality to the oscillator while allowing it to remain locked to the reference clock. A predictable and potentially guaranteed average frequency over a certain number of cycles allows the integrated circuit, e.g. of a CPU, to operate with predictable and potentially guaranteed performance, even when operating in a spread spectrum mode. This differs from free-running spread spectrum oscillators, which are inherently inaccurate and thus are less likely to provide predictable and consistent performance.

The spread spectrum mode may help to protect against side channel attacks by spreading the output frequency of circuits clocked by the oscillator over a range of frequencies, thus making statistical analysis of the side channel traces very difficult. Side channel attacks using statistical trace analysis become much more difficult if the traces are not aligned in time, such that traces from different runs do not overlap.

Providing a spread-out frequency spectrum, without substantially sacrificing accuracy of the average output frequency means that the need for expensive techniques to reduce EMI such as shielding, EMI filtering, and altering circuit layout is reduced. Therefore, embodiments of the invention may provide less costly side channel attack prevention while keeping the performance of the integrated circuit consistent.

The approach described above may be used in isolation or in combination with other countermeasures to mitigate against side channel attacks. The output clock signal may provide a clock domain for any systems or subsystems where it is desirable to prevent side-channel attacks.

The integrated circuit may comprise a plurality of clock domains, some or all of which are clocked by closed loop oscillator circuit portions having the characteristics specified herein.

In a set of embodiments, the integrated circuit comprises a secure clock domain comprising at least one secure component and the output clock signal is provided to clock the secure clock domain. The one or more secure components may comprise sensitive or critical information, e.g. secure processors, cryptographic keys, secret firmware, configuration data etc. Such information could be targeted in side-channel attacks and so the invention may help to protect against this information being accessed by an unauthorised attacker.

The integrated circuit may only require protection of secure components against side channel attacks and so any non-secure components on the integrated circuit may be clocked either by another oscillator circuit portion or the closed loop oscillator circuit portion described herein operating in a 'normal mode' wherein the instantaneous output frequency remains substantially constant.

The closed loop oscillator circuit portion may operate in the spread spectrum mode at all times during operation of the integrated circuit. In a set of embodiments, however, the spread spectrum mode may be selectively disabled. In a set of embodiments, when the spread spectrum mode is disabled, one or more component(s) which provide variation of the output frequency (e.g. a frequency variation circuit portion) are disconnected from the closed loop oscillator circuit portion, e.g. via a switch. When the spread spectrum mode is disabled, the closed loop oscillator circuit portion may be operating in a 'normal' mode—i.e. with no frequency variation and thus no spread spectrum.

The reference clock signal may be provided by any suitable reference clock—e.g. a crystal-based oscillator, an RC oscillator or an LC oscillator etc. In a set of embodiments, however, the reference clock signal is provided by a quartz crystal—e.g. having a frequency between approximately 32 kHz and 32 MHz.

The closed loop oscillator circuit portion may comprise a phase locked loop. However, in a preferred set of embodiments, the closed loop oscillator circuit portion comprises a frequency locked loop. It will be appreciated by those skilled in the art that a frequency locked loop operates similarly to a phase locked loop, however, instead of a voltage controlled oscillator (VCO) and a phase detector to phase lock an output signal to a reference signal; a frequency locked loop typically uses a numerically controlled oscillator (NCO) and a frequency comparison module (e.g. a frequency comparator) to frequency lock an output signal to a reference signal. The frequency locked loop may comprise one or more of the following: a frequency comparison module (e.g. a frequency comparator), a value register and a numerically controlled oscillator (NCO). In a set of embodiments, the output signal is output from the NCO.

In a set of embodiments, the average output frequency of the closed loop oscillator circuit portion is a multiple, N, of the reference clock signal. In other words the closed loop oscillator circuit portion acts as a frequency multiplier as is well known per se in the art. The frequency multiple, N, could be fixed or could be variable. It could be an a fraction but is typically an integer.

As described above, in the spread spectrum mode the closed loop oscillator circuit portion varies the output frequency by temporarily increasing the frequency of the output signal by a predetermined amount and temporarily decreasing the frequency by the same predetermined amount, at different times, within a predetermined number of reference clock cycles. The predetermined number of reference clock cycles could have any value but conveniently it is an even number. It may also be advantageous for the number to be relatively low to enhance the stability of the average frequency. In a preferred set of embodiments therefore the predetermined number is two. In other words the frequency is decreased and increased by the same amount every two cycles of the reference clock.

It should be understood that the predetermined amount by which the frequency of the output signal is increased and decreased may be defined relative to the average output frequency. In other words, the output frequency may be varied such that the frequency of the output signal is temporarily increased by a predetermined amount from a value which is equal to the desired average output frequency, and is temporarily decreased by a predetermined amount from a value which is equal to the desired average output frequency. Thus, at one point in time, for a predetermined number of reference clock cycles, the output frequency may be increased to a value which is equal to the average output frequency plus a predetermined amount, and at another point in time, after the predetermined number of reference clock cycles, the output frequency may be decreased to a value which is equal to the average output frequency minus the same predetermined amount for the predetermined number of reference clock cycles.

As will be appreciated, over the predetermined number of reference clock cycles there can be considered to be at least one 'pair' comprising respectively an increase in output frequency and a decrease in output frequency by the same amount. The increase in frequency and decrease in frequency, of each pair, need not be consecutive. A stable average output frequency is maintained as long as the total increase in frequency over the clock cycle matches the total decrease in frequency over the predetermined number of reference clock cycles.

In a set of embodiments, there are a plurality of such pairs. The magnitude of the change in frequency for each of the pairs may be the same as the other pairs but in a set of such embodiments the magnitude of frequency change differs between the pairs. For example in a set of embodiments a first pair varies the frequency up and down by a first magnitude and a second pair varies the frequency up and down by a second magnitude; wherein the first magnitude differs from the second magnitude. The pairs may be sequential but this is not essential—so that they could be nested or interleaved, as long as each increase in frequency is paired with a corresponding decrease in frequency at some point during the predetermined number of reference clock cycles.

In an example set of embodiments, the spread spectrum mode works by rapidly shifting the frequency of the oscillator by a varying offset frequency ($\Delta f$) for a frequency shift period, so that the 'instantaneous' output frequency of $f_{output} = f_{average} + \Delta f$ is rapidly followed by $f_{output} = f_{average} - \Delta f$. Thus, the average frequency of two sequences is $f_{average}$ which remains the same over consecutive periods of predetermined numbers of reference clock cycles. The frequency shift period could comprise a predetermined number of reference clock cycles. Instantaneous should be understood to mean as rapidly as possible, accounting for inevitable delays in the components of the physical circuitry.

Since the frequency offsets pairwise cancel each other, the timing constant of the feedback loop of the oscillator equals two frequency shift periods, allowing the loop to lock on to a multiple of the reference clock, even if the instantaneous clock has a frequency shift. This may allow large frequency shifts to be applied to the oscillator circuit portion, allowing the EMI to be spread over a wide frequency band, while still providing an accurate average frequency without losing lock.

In a set of embodiments, the integrated circuit comprises a frequency variation circuit portion for varying the output frequency.

In a set of such embodiments, the frequency variation circuit portion comprises: a waveform generator and a polarity alternator. The frequency variation circuit portion may provide a waveform as a frequency offset to the closed loop oscillator circuit portion, e.g. at the output of the value register thereof. The polarity alternator may temporarily add and temporarily subtract the frequency offset in an alternating manner.

In a set of embodiments, the polarity alternator is clocked by the reference clock signal and the closed loop oscillator circuit portion (e.g. the frequency locked loop) is clocked by a loop clock signal having a frequency that is divided from the reference clock signal—e.g. the loop clock signal may be provided by a divide-by-two divider acting on the reference clock signal. In such a set of embodiments, for each cycle of the loop clock signal (i.e. two cycles of the reference clock)

the polarity alternator will have added a frequency offset (i.e. temporarily increased the frequency by a predetermined amount) and subtracted the same frequency offset (i.e. temporarily decreased the frequency by said predetermined amount) such that the average output frequency remains the same. In such arrangements the closed loop oscillator circuit portion may comprise a frequency divider arranged to divide the frequency of a feedback signal (e.g. between an NCO and a frequency comparison module) by 2N, wherein N is the multiplication factor of the closed loop oscillator circuit portion relative to the reference clock.

The waveform generator may generate any suitable waveform—e.g. sinusoidal, square, triangular, sawtooth etc. In a set of embodiments, the waveform generator generates a sawtooth signal as the frequency offset.

The waveform generator may be configured to generate a frequency offset signal, and the polarity alternator may be configured to change the polarity of the frequency offset signal every reference clock cycle, such that the frequency offset provided from the frequency variation circuit portion to the closed loop oscillator portion is temporarily added to and subtracted from the frequency of the output clock signal in an alternating manner for consecutive reference clock cycles.

The frequency offset signal generated by the waveform generator may be any suitable waveform—e.g. sinusoidal, square, triangular, sawtooth etc.

In a set of example embodiments, wherein the reference clock signal is generated by a 32 kHz reference clock, the output frequency is adjusted every 1 µs, such that there is a new pair approximately every 2 µs—which gives approximately 15 pairs every two reference clock cycles.

Features of any aspect or embodiment described herein may, wherever appropriate, be applied to any other aspect or embodiment described herein. Where reference is made to different embodiments or sets of embodiments, it should be understood that these are not necessarily distinct but may overlap.

DETAILED DESCRIPTION

Figure 2:
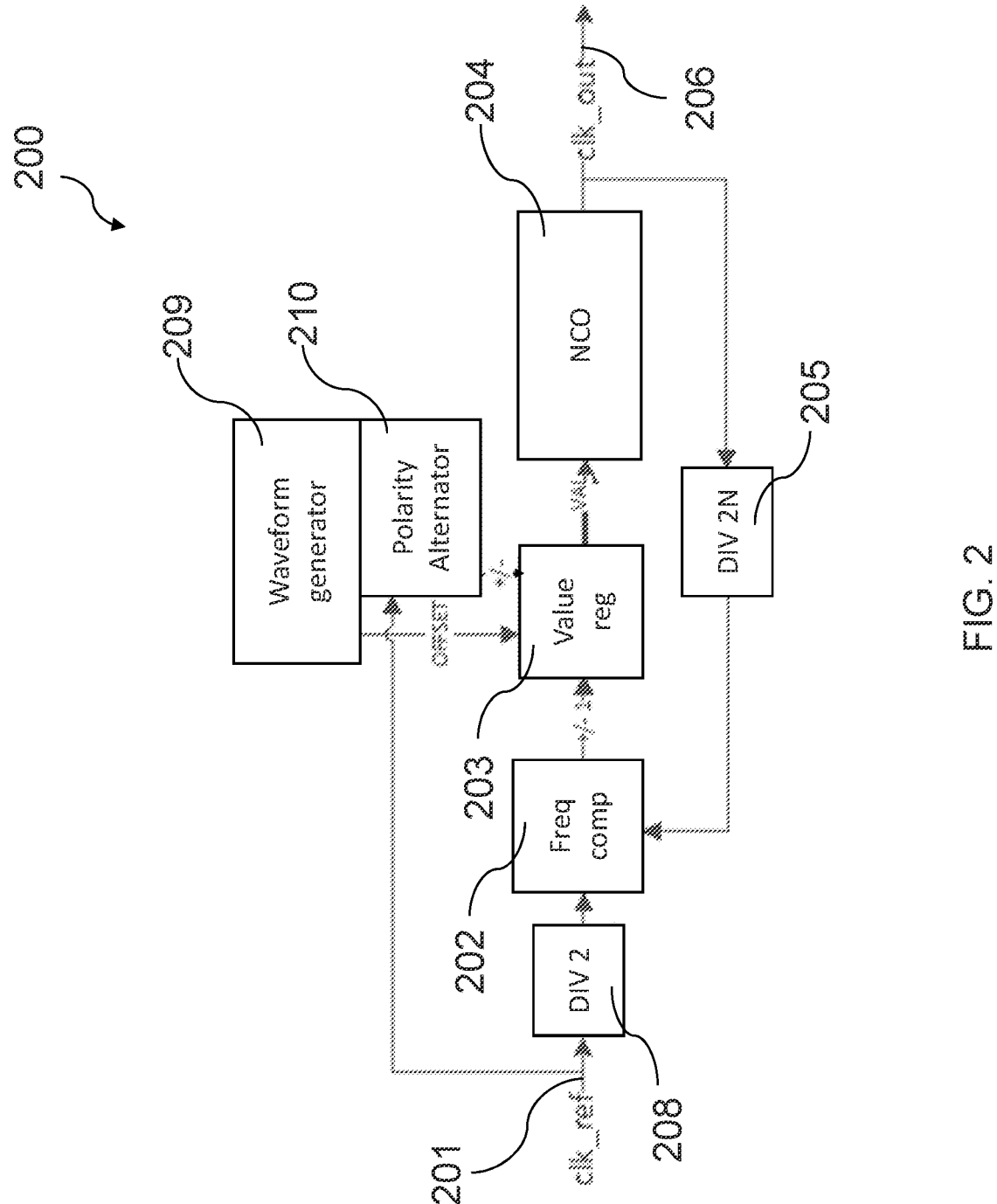
Figure 3:
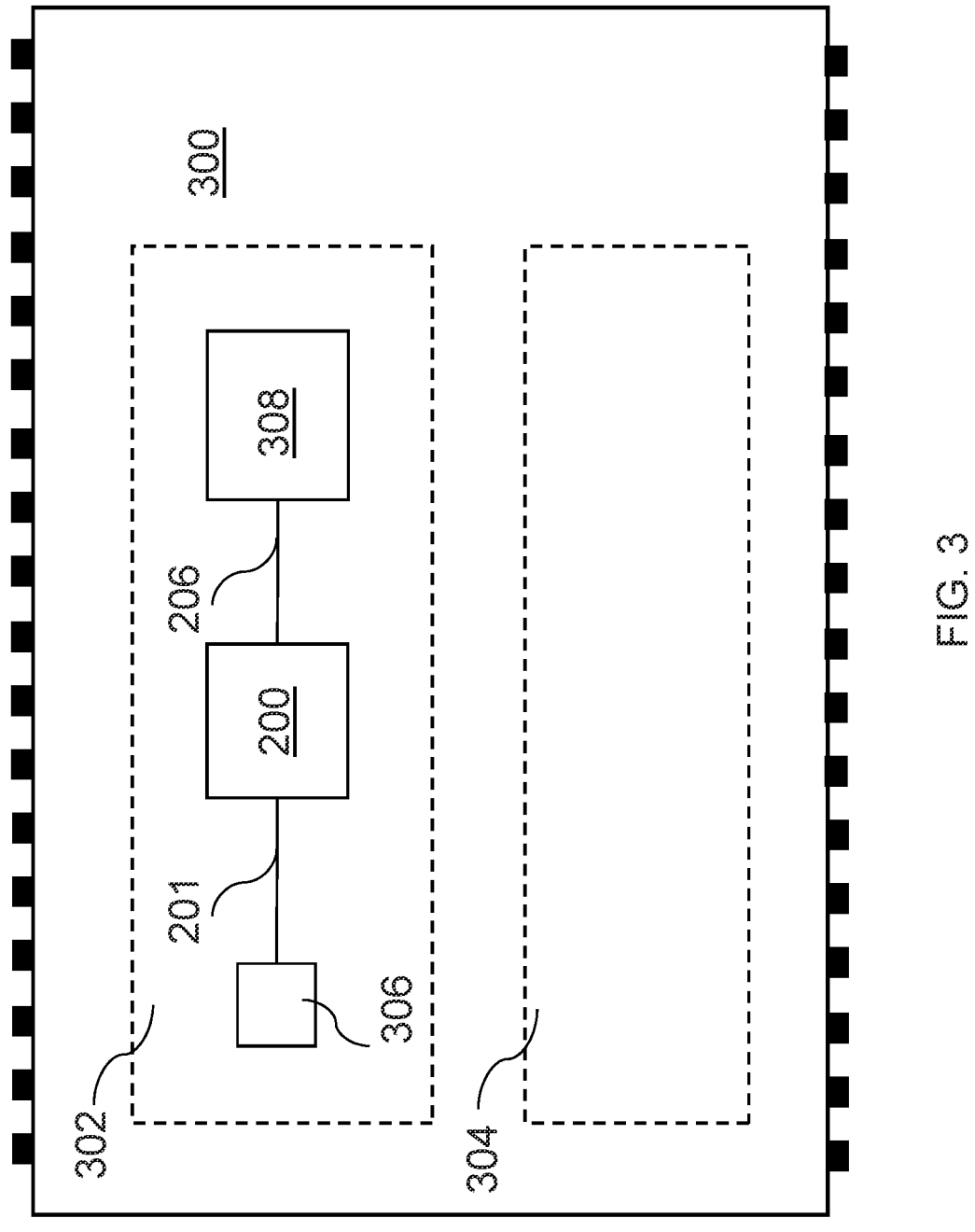
Figure 4:
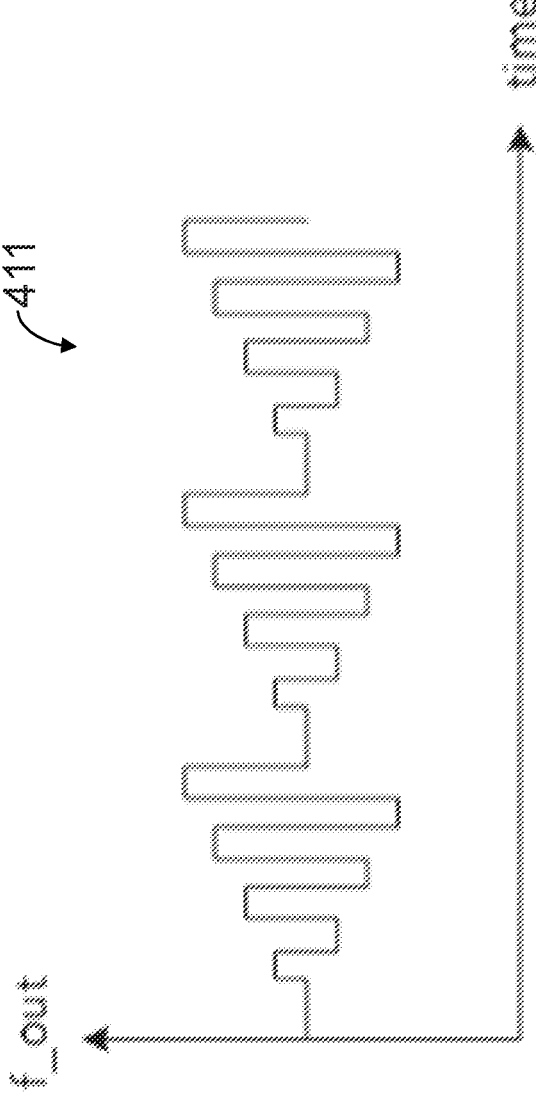

Certain embodiments of the invention will now be described, by way of example only, with reference to the accompanying drawings, in which:

FIG. 1 schematically shows an integrated circuit including a frequency locked loop, for reference purposes only;

FIG. 2 schematically shows a closed loop oscillator circuit portion in accordance with an embodiment of the invention;

FIG. 3 is a highly schematic diagram of an integrated circuit incorporating the oscillator circuit portion of FIG. 2; and FIG. 4 is a graph showing the frequency variation provided by the circuit shown in FIG. 2.

An example of a typical frequency locked loop (FLL) frequency multiplier circuit 100 is shown in FIG. 1. This comprises the following circuit components arranged in a closed loop: a numerically controlled oscillator (NCO) 104; a frequency divider 105; a frequency comparison module 102; and a value register 103. The FLL receives a reference clock signal (clk_ref) e.g. from a crystal at an input 101 and provides an output clock signal (clk_out) at an output 106 which is a multiple, N, of the reference clock frequency.

The NCO 104 is controlled by the value register 103. The frequency of the output clock (clk_out) signal is divided by N at the frequency divider 105 and is compared to the reference clock signal (clk_ref) at the frequency comparison module 102. The value (VAL) output by the value register 103 is incremented or decremented according to the output of this comparison. This negative feedback loop operates until the output frequency at the output 106 settles to a frequency that is N times the reference frequency present at the input 101.

As the circuit of FIG. 1 generates an output signal having a fixed single frequency, systems which are clocked by it may emit side channel information in the form of electromagnetic emissions, e.g. electromagnetic interference (EMI), which can reveal information about secret keys. Side channel attacks exploit statistical analysis of this side channel information and attackers could gain access to such protected information.

An oscillator circuit portion 200 forming part of an embodiment of the invention is schematically shown in FIG. 2. Similarly to the circuit 100 of FIG. 1, the circuit portion 200 of FIG. 2 comprises a numerical controlled oscillator (NCO) 204; a frequency divider 205; a frequency comparison module 202; and a value register 203 arranged in a closed loop—i.e. effectively an N-factor multiplier frequency locked loop.

As with FIG. 1, a reference clock signal (clk_ref) is received at an input 201 and an output clock signal (clk_out) 206 having a frequency of N times clk_ref is provided at an output 206.

In addition to the typical components of an NCO-based FLL frequency multiplier, the integrated circuit 200 comprises: a divide-by-2 frequency divider 208 between the input 201 and the frequency comparison module 202; a waveform generator 209 connected to the value register 203; and a polarity alternator 210 connected between the input 201 and the value register 203. To compensate for the frequency divider by −2 208, the loop frequency divider 205 is configured to divide the frequency of the feedback signal by 2N.

The polarity alternator 210 is clocked by the reference clock signal (clk_ref) 201. The waveform generator 209 is clocked by the reference clock signal (clk_ref) 201 through the polarity alternator.

FIG. 3 shows an integrated circuit 300, comprising a secure clock domain 302 and a non-secure clock domain 304. The secure clock domain includes the closed loop oscillator portion 200 shown in FIG. 2 with a crystal oscillator 306 connected to its input 201 and a security critical circuits 308 connected to its output 206. The non-secure clock domain 304 may have a standard clock circuit (not shown).

The closed loop oscillator circuit portion 200 shown in FIG. 2 is arranged to be operable in a spread spectrum mode which operates by constantly adjusting the instantaneous output frequency at the output 206, thereby helping reduce electromagnetic interference (EMI) in a given frequency band, while remaining locked to the reference clock frequency. This is explained in more detail below.

The circuit portion 200 works by rapidly shifting the output frequency 206 by a varying OFFSET which, for every cycle of the reference clock signal 201, is alternatingly added or subtracted from the value (VAL) output from the value register 203.

The arrangement of the integrated circuit 200 shown in FIG. 2 allows the average frequency of the output signal (clk_out) 206 to remain stable. As mentioned above, the reference clock 201 clocks the polarity alternator 210. The frequency locked loop is effectively clocked by a signal that has a frequency which is half the reference clock frequency because the frequency divider 208 is inserted between the reference clock signal 201 and the frequency comparison module 202.

As the OFFSET waveform is added for a first cycle of the reference clock, and subtracted for the next cycle of the reference clock, the output frequency has a net change of zero over two periods of the reference clock. Therefore, every two cycles of the reference clock (clk_ref), a new comparison is made in the frequency comparison module 202 and a new OFFSET value is applied by the waveform generator 209, i.e. every two reference clock periods will see one positive and one negative frequency offset in f_out.

As a result of the divider 208 at the input to the frequency comparator 202, the loop frequency divider 205 must divide the signal fed back from the NCO 204 by 2N so that the frequency of the out clock signal 206 is N times the reference clock frequency.

Since the instantaneous output frequency is changing throughout operation of the spread spectrum mode, the EMI produced by the secure circuits 308 will be spread across a range of frequencies determined by the waveform pattern generated by the waveform generator 209. However the average frequency remains stable at clk_ref×N which allows the secure circuits 308 to operate more efficiently.

FIG. 4 shows a graph of the frequency variation (f_out) 411 provided by the waveform generator 209 and polarity alternator 210 shown in FIG. 2.

As discussed with reference to FIG. 2, the waveform generator is clocked by the reference clock (clk_ref) 201 through the polarity alternator.

The waveform generator 209 generates a sawtooth wave. The polarity generator 210 changes the sign of the sawtooth wave every reference clock cycle, i.e. by alternating the polarity every reference clock cycle to provide the OFFSET waveform. This results in the instantaneous output frequency varying in accordance with the waveform 411 shown in FIG. 4.

The timescale along the x-axis is defined such that the polarity of the output frequency (f_out) changes every clk_ref period.

The waveform generator 209 could be configured to output a number of different wave patterns, but a sawtooth waveform, as shown in FIG. 4, has been found by the applicant to be particularly suitable for spreading the frequency across a wider band.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated circuit comprising:
   a closed loop oscillator circuit portion comprising:
      an input for a reference clock signal;
      an output providing an output clock signal to one or more further components of the integrated circuit, the output clock signal having an average output frequency derived from the reference clock signal;
   wherein the closed loop oscillator circuit portion is arranged to be operable in a spread spectrum mode in which the closed loop oscillator circuit portion varies a frequency of said output clock signal, by:
      increasing the frequency of the output clock signal to a first constant frequency equal to the average output frequency increased by a predetermined offset frequency amount for a first frequency shift period; followed by:

decreasing the frequency of the output clock signal to a second constant frequency equal to the average output frequency decreased by said predetermined offset frequency amount for a second frequency shift period;
   wherein the first and second frequency shift periods are a predetermined multiple of the clock cycle of the reference clock signal.

2. The integrated circuit of claim 1, wherein the closed loop oscillator circuit portion comprises a frequency locked loop.

3. The integrated circuit of claim 2, wherein the frequency locked loop comprises one or more of the group comprising: a frequency comparison module; a value register; and a numerically controlled oscillator.

4. The integrated circuit of claim 1, wherein the average output frequency of the closed loop oscillator circuit portion is a multiple, N, of the reference clock signal.

5. The integrated circuit of claim 4, wherein the closed loop oscillator circuit portion comprises a frequency divider arranged to divide the frequency of a feedback signal by 2N.

6. The integrated circuit of claim 1, comprising a frequency variation circuit portion for varying the output frequency.

7. The integrated circuit of claim 6, wherein the frequency variation circuit portion comprises: a waveform generator and a polarity alternator.

8. The integrated circuit of claim 7, wherein the polarity alternator is clocked by the reference clock signal and the closed loop oscillator circuit portion is clocked by a loop clock signal having a frequency that is divided from the reference clock signal.

9. The integrated circuit of claim 6, wherein the frequency variation circuit portion is arranged to provide a waveform as a frequency offset to the closed loop oscillator circuit portion.

10. The integrated circuit of claim 7, wherein:
   the waveform generator is configured to generate a frequency offset signal; and
   the polarity alternator is configured to change the polarity of the frequency offset signal every reference clock cycle, such that a frequency offset provided from the frequency variation circuit portion to the closed loop oscillator portion is added to and subtracted from the frequency of the output clock signal in an alternating manner for consecutive reference clock cycles.

11. The integrated circuit of claim 1, comprising a secure clock domain comprising at least one secure component and the output clock signal being arranged to clock the secure clock domain.

12. The integrated circuit of claim 1, arranged to disconnect one or more component(s) which provide variation of the output frequency from the closed loop oscillator circuit portion when the spread spectrum mode is disabled.

13. The integrated circuit of claim 1, wherein the reference clock signal is provided by a quartz crystal.

14. A method of operating an integrated circuit, the integrated circuit comprising a closed loop oscillator circuit portion, comprising the oscillator circuit portion:
   receiving a reference clock signal;
   generating an output clock signal having an average output frequency derived from the reference clock signal, providing said output clock signal to one or more further components of the integrated circuit;
and the method comprising, in a spread spectrum mode:
   the oscillator circuit portion varying a frequency of said output clock signal, by:

increasing the frequency of the output clock signal to a first constant frequency equal to the average output frequency increased by a predetermined offset frequency amount for a first frequency shift period; followed by:

decreasing the frequency of the output clock signal to a second constant frequency equal to the average output frequency decreased by said predetermined offset frequency amount for a second frequency shift period;

wherein the first and second frequency shift periods are a predetermined multiple of the clock cycle of the reference clock signal.

* * * * *